(12) United States Patent
Allamano et al.

(10) Patent No.: US 11,112,535 B2
(45) Date of Patent: Sep. 7, 2021

(54) REAL-TIME COMPUTATION OF AN ATMOSPHERIC PRECIPITATION RATE FROM A DIGITAL IMAGE OF AN ENVIRONMENT WHERE AN ATMOSPHERIC PRECIPITATION IS TAKING PLACE

(71) Applicant: WATERVIEW SRL, Turin (IT)

(72) Inventors: Paola Allamano, Turin (IT); Andrea Cagninei, Turin (IT)

(73) Assignee: WATERVIEW SRL, Turin (IT)

(*) Notice: Subject to any disclaimer, the term of this patent is extended or adjusted under 35 U.S.C. 154(b) by 62 days.

(21) Appl. No.: 16/609,990

(22) PCT Filed: Aug. 10, 2018

(86) PCT No.: PCT/IB2018/056032
§ 371 (c)(1),
(2) Date: Oct. 31, 2019

(87) PCT Pub. No.: WO2019/030714
PCT Pub. Date: Feb. 14, 2019

(65) Prior Publication Data
US 2020/0049856 A1    Feb. 13, 2020

(30) Foreign Application Priority Data
Aug. 11, 2017 (IT) .................. 102017000093530

(51) Int. Cl.
*G01W 1/14* (2006.01)
*G06T 7/20* (2017.01)

(52) U.S. Cl.
CPC .............. *G01W 1/14* (2013.01); *G06T 7/20* (2013.01); *G06T 2207/10016* (2013.01)

(58) Field of Classification Search
None
See application file for complete search history.

(56) References Cited

U.S. PATENT DOCUMENTS 6,353,392 B1 * 3/2002 Schofield ........... B60H 1/00785
                                                        318/444
9,436,997 B2    9/2016 Cerqueira et al.
(Continued)

FOREIGN PATENT DOCUMENTS

CN        102 707 340        10/2012

OTHER PUBLICATIONS

P. Allamano et al: "Toward the camera rain gauge", Water Resources Research, vol. 51, No. 3, Mar. 1, 2015 (Mar. 1, 2015), pp. 1744-1757, XP055212778, ISSN: 8843-1397. DOI: 18.1002/2814WR816298 abstract Section 2 figures 2-4, 6,7.
(Continued)

*Primary Examiner* — Vikkram Bali
(74) *Attorney, Agent, or Firm* — Leason Ellis LLP

(57) ABSTRACT

An atmospheric precipitation rate computation system, comprising an electronic digital image/video capture apparatus to capture digital images/videos of an environment in which an atmospheric precipitation is taking place; an electronic digital image processing apparatus connected to the electronic digital image/video capture apparatus to receive therefrom and process captured digital images/videos to compute atmospheric precipitation rates of atmospheric precipitations which are taking place in the environments shown in the received digital images/videos; and an electronic display device connected to the electronic digital image processing apparatus to receive therefrom and display the computed atmospheric precipitation rate. The electronic digital image processing apparatus is configured to compute an atmospheric precipitation rate of an atmospheric precipitation which is taking place in an environment shown in a captured digital image based on the atmospheric precipitation brightness in the captured digital image and on a mathematical model that expresses the atmospheric precipitation bright- (Continued)

ness in a captured digital image as a function of an atmospheric precipitation rate of an atmospheric precipitation that is taking place in an environment shown in a captured digital image.

12 Claims, 3 Drawing Sheets

(56) References Cited

U.S. PATENT DOCUMENTS 10,564,085 B2 * 2/2020 Loffler-Mang .......... G01W 1/14
2017/0371074 A1 * 12/2017 Elkabetz ................. G01S 13/95

OTHER PUBLICATIONS

Kshitiz Garget Al: "Vision and Rain", International Journal of Computer Vision, Kluwer Academic Publishers, 80, vol. 75, No. 1, Feb. 15, 2007 (Feb. 15, 2007), pp. 3-27, XP019534970, ISSN: 1573-1405, DOI: 10.1007/S11263-006-0028-6 abstract p. 4, left-hand column, paragraph 2 Section 5.1; Section 6; Section 8; section 4.3; figures 9,11,14,18.

* cited by examiner

REAL-TIME COMPUTATION OF AN ATMOSPHERIC PRECIPITATION RATE FROM A DIGITAL IMAGE OF AN ENVIRONMENT WHERE AN ATMOSPHERIC PRECIPITATION IS TAKING PLACE

CROSS-REFERENCE TO RELATED PATENT APPLICATIONS

This application is a U.S. National Phase Application under 35 U.S.C. § 371 of International Patent Application No. PCT/IB2018/056032, filed Aug. 10, 2018, which claims priority from Italian Patent Application no. 102017000093530 filed on Aug. 11, 2017, all of which are incorporated by reference, as if expressly set forth in their respective entireties herein.

TECHNICAL FIELD OF THE INVENTION

The present invention relates to real-time, image processing-based computation of an atmospheric precipitation rate of any atmospheric precipitation, whether rain, snow or hail, based on a digital image of an environment where the atmospheric precipitation is taking place and captured by any digital image capture apparatus.

STATE OF THE ART

As is known, many fields and applications, such as civil protection, precision agriculture, transport safety or outdoor sports, require real-time information on the spatial and temporal distribution of atmospheric precipitations, and in particular rain. Traditional rain gauges-based atmospheric precipitation measurement networks, however, are often too scattered to collect highly reliable atmospheric precipitation data.

For this reason, image processing technologies have been developed which allow large amounts of atmospheric precipitation data to be simply, rapidly, and economically collected, with substantially the same local accuracy as traditional rain gauges.

One of these technologies is, for example, disclosed in U.S. Pat. No. 9,436,997 B2, wherein a digital image captured in the environment where it is raining is compared with a reference image which is selected, based on the light condition of the captured digital image, within a set of rain-free reference images spanning different light conditions, and the rainfall rate is then computed based on the difference between the captured image with rain, and the selected rain-free reference image.

OBJECT AND SUMMARY OF THE INVENTION

The Applicant has experienced that the above-described state-of-the-art technology is dependent on the availability of a rich database of reference images with which the captured images have to be compared, and the storage of which thus requires the availability of considerable storage resources.

The object of the present invention is therefore to provide a technology that allows a reliable computation of the atmospheric precipitation rate, without requiring the availability of a rich database of reference images and, consequently, of considerable storage resources.

According to the present invention, a real-time atmospheric precipitation rate computation system is provided, as claimed in the appended claims.

DETAILED DESCRIPTION OF PREFERRED EMBODIMENTS OF THE INVENTION

The present invention will now be described in detail with reference to the appended figures to enable a skilled person to make and use it. Various modifications to the embodiments described will be immediately apparent to the skilled person and the general principles described may be applied to other embodiments and applications, while remaining within the scope of protection of the present invention, as defined in the appended claims. The present invention should not therefore be considered limited to the embodiments described and shown, but should be given a broader scope of protection according to the characteristics described and claimed herein.

Moreover, for purely descriptive reasons and where strictly necessary, reference will be made to an atmospheric precipitation in the form of rain, without however loosing generality.

Figure 1:
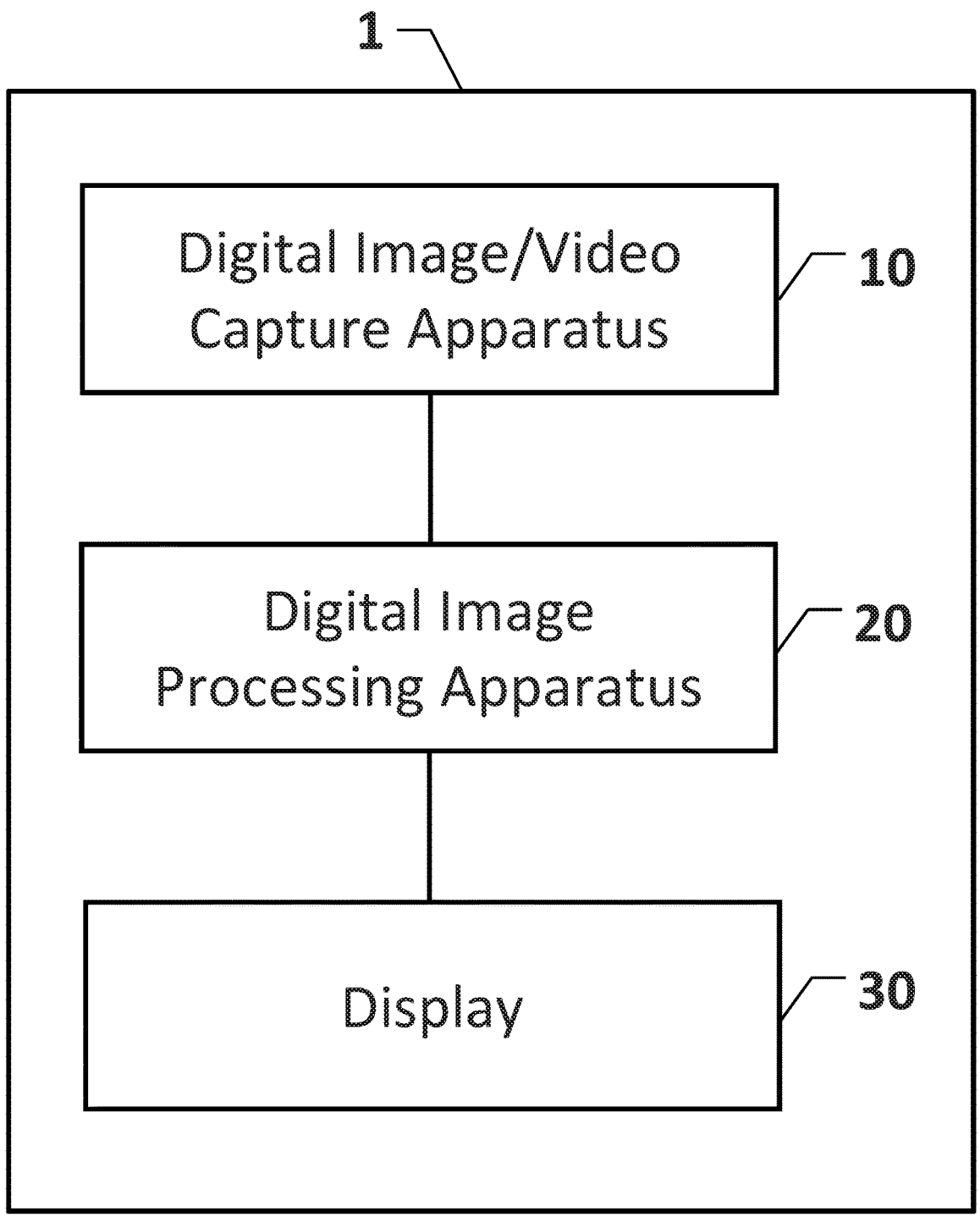
FIG. 1 shows a block diagram of a real-time atmospheric precipitation rate computation system.
Figure 2:
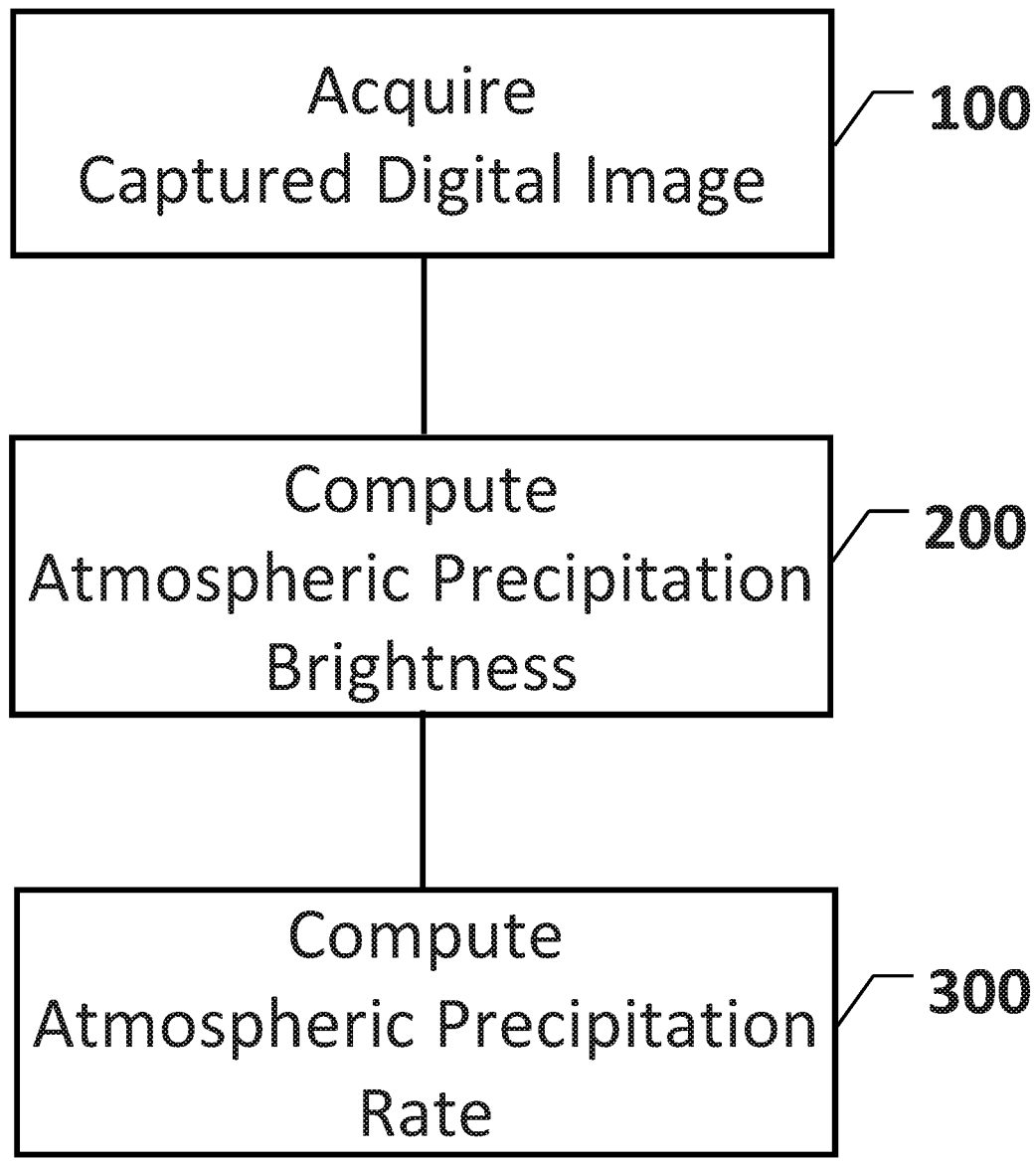
FIGS. 2 and 3 show flowcharts of operations implemented by the system in FIG. 1 to real-time compute the atmospheric precipitation rate.
Figure 3:
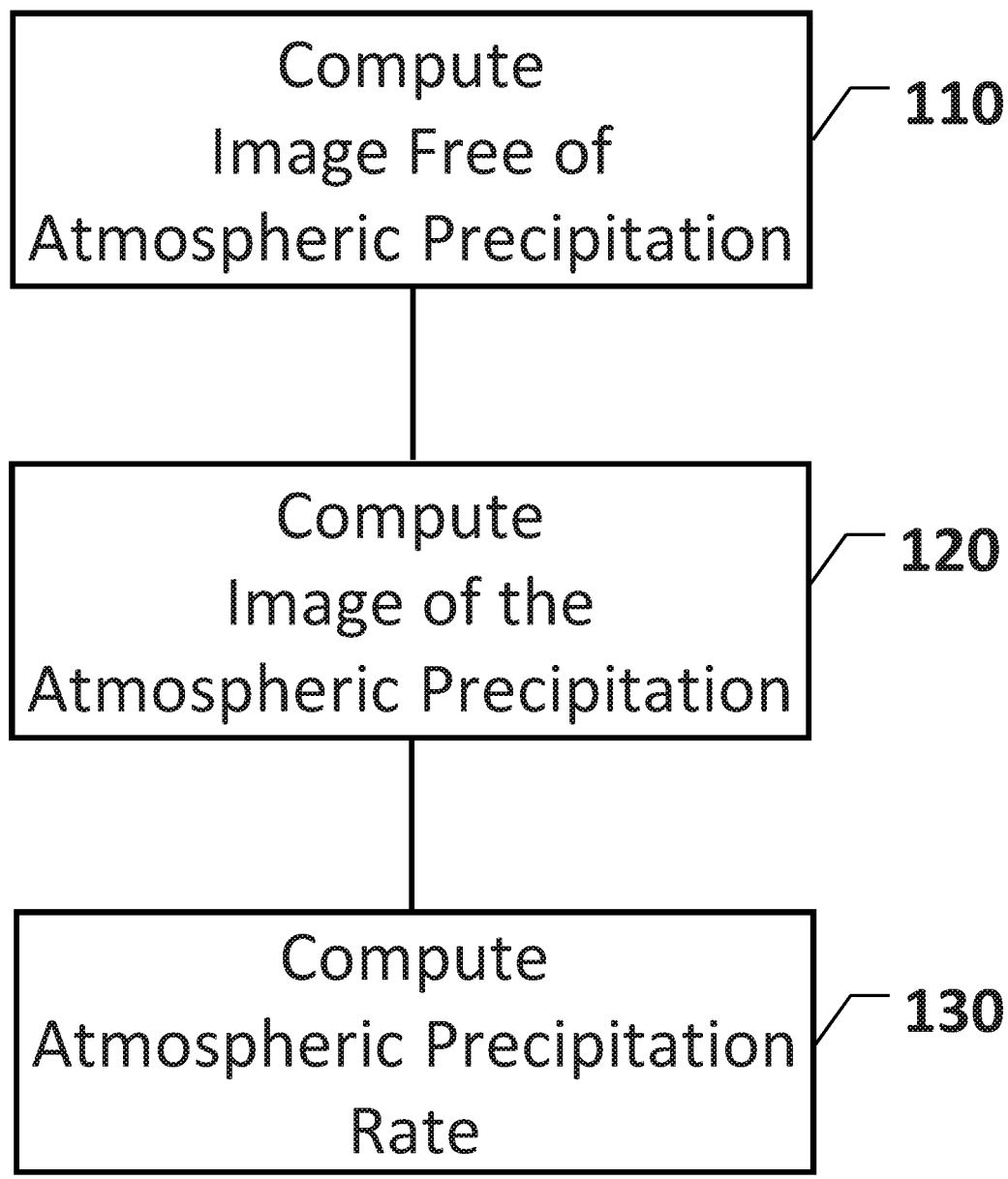

FIG. 1 shows a block diagram of an atmospheric precipitation rate computation system 1 according to the present invention, which basically comprises:

an electronic digital image/video capture apparatus 10 to capture digital images/videos of an environment where an atmospheric precipitation, the rate of which is to be computed, is taking place; and an electronic digital image processing apparatus 20 connected to the electronic digital image/video capture apparatus 10, and programmed to store and execute an atmospheric precipitation rate computation software designed to receive and process digital images/videos captured by the electronic digital image/video capture apparatus 10 to compute, as described in detail hereinafter, the atmospheric precipitation rate in the environment shown in the captured digital images/videos.

Conveniently, the atmospheric precipitation rate computation system 1 further comprises:

an electronic display 30 connected to the electronic digital image processing apparatus 20 to display the computed atmospheric precipitation rate.

The atmospheric precipitation rate computation system 1 may have either a concentrated architecture, in which the components thereof are integrated into a single apparatus, such as a smartphone, or a distributed architecture, in which the components thereof are remotely mutually arranged, or even a hybrid architecture, in which some of the components thereof are integrated into a single or into various physically separate apparatuses, while other individual components are remotely arranged and suitably connected thereto.

The electronic digital image/video capture apparatus 10 comprises one or more digital image sensors that may be in the form of traditional, commercially available, stand-alone digital cameras, or integrated into other electronic apparatuses such as smartphones, and for example of the type based on Charge-Coupled Devices (CCD) or Complementary Metal-Oxide-Semiconductors (CMOS), also known as APS (Active Pixel Sensors).

The digital images are captured according to criteria that also depend, among other things, on the type of electronic digital image/video capture apparatus 10 and that will not be described in detail as they are not part of the present invention. By way of example, if the electronic digital image/video capture apparatus 10 comprises digital image sensors not specifically intended for atmospheric precipitation monitoring, such as those intended for domestic or industrial surveillance, or for environmental monitoring, in particular of traffic or other public urban or extra-urban areas, etc., the electronic digital image/video capture apparatus 10 could, for example, be operated periodically to capture individual, temporally spaced digital images, or short or long sequences of digital images so close in time as to form short or long digital videos, for example at a calibratable capture rate, for example, every second or every few seconds. If the electronic digital image/video capture apparatus 10 comprises digital image sensors of smartphones, the electronic digital image/video capture apparatus 10 could be operated in response to a specific manual user command.

Similarly, the connection between the electronic digital image capture apparatus 10 and the electronic digital image processing apparatus 20 may be in different forms, depending on the type and the mutual arrangement, and in particular could be wired, wireless, or hybrid, namely a combination of the two previous types.

For example, the connection could be wired when the electronic digital video/image capture apparatus 10 and the electronic digital image processing apparatus 20 are close enough to allow this type of connection, for example when they are part of a single electronic apparatus, such as, for example, a smartphone, or are the first one a domestic surveillance camera, and the second one a home computer present in the monitored environment.

Conversely, the connection could be entirely or partly wireless when the electronic digital video/image capture apparatus 10 and the electronic digital image processing apparatus 20 are relatively set apart to prevent a fully wired connection, for example when the first one is a public area environmental surveillance camera, and the second one is a remote server. In these cases, the wireless connection could comprise one or more short-range or long-range wireless communication systems, depending on the distance to be covered, and based on technologies that are available on the market and are most appropriate to the circumstances.

By way of non-limiting example, the short-range wireless communication system may be based on the Bluetooth technology, conveniently the one according to specification 4.0 and also known as Bluetooth Low Energy, Bluetooth LE or Bluetooth Smart, on the Wi-Fi technology, namely capable of connecting to a wireless local area network (WLAN), or even on the mesh wireless network technology.

The long-range wireless communication system, on the other hand, may be based on mobile telephony (GSM, LTE, etc.), or be of the type that can connect to a packet switched computer network and include a router to connect to the Internet.

Similarly, the electronic digital image processing apparatus 20 may be in various forms, depending on the type of electronic digital image/video capture apparatus 10. For example, the electronic digital image processing apparatus 20 may be a microprocessor of a smartphone which also includes the electronic digital image/video capture apparatus 10, a remote server, for example a web server, for example a cloud web server, when the electronic digital image processing apparatus 20 is set apart from the electronic digital image/video capture apparatus 10, or when the electronic digital image processing apparatus 20 is a microprocessor of a smartphone that also includes the electronic digital image/video capture apparatus 10, but the computational resources of the smartphone's microprocessor available for processing the digital image are insufficient.

The remote server may be also configured to communicate with different electronic processing apparatuses 20 to receive, store and process the atmospheric precipitation rates computed by different electronic processing apparatuses 20, and implement a data analysis engine designed to compute and make the processed data, such as reports and graphic and statistical processing of the atmospheric precipitation rates computed by different electronic processing apparatuses 20, accessible on-line and in real-time via stationary (PC) and mobile user terminals (smartphones or tablets).

The electronic display 30 may also be in different forms, depending on the type of electronic digital image/video capture apparatus 10 and of the electronic digital image processing apparatus 20, as well as the type of connection. For example, the electronic display 30 may be the display of the smartphone that also comprises the electronic digital video/image capture apparatus 10 and/or the electronic digital image processing apparatus 20, or the display of any other stationary (PC) and mobile user terminal (smartphone or tablet) in communication with the remote server, in which the atmospheric precipitation rate is computed or simply stored.

Coming now to the computation of the atmospheric precipitation rate in the environment shown in the digital images/videos captured by the electronic digital video/image capture apparatus 10, the Applicant has developed a software that implements a methodology that allow a significant computational improvement to be achieved both in terms of independence of the computation from a database of reference images with which to compare the captured images, and of the type of digital video/image capture apparatus 10 used, as well as of the amount of computational and storage resources necessary to execute the software.

In brief, the atmospheric precipitation rate computation software developed by the Applicant is designed to compute the atmospheric precipitation rate that is taking place in an environment from a captured digital image of the environment and a mathematical model that expresses a dependence of an atmospheric precipitation brightness in a captured digital image on an atmospheric precipitation rate that is taking place in an environment shown in a captured digital image.

In particular, the atmospheric precipitation rate computation software developed by the Applicant is designed to compute the atmospheric precipitation rate by implementing the following operations:
  acquiring a captured digital image of the environment where an atmospheric precipitation is taking place, the rate of which is to be computed (block 100),
  computing the atmospheric precipitation brightness in the captured digital image (block 200), and
  computing the atmospheric precipitation rate in the environment shown in the captured digital image based on the atmospheric precipitation brightness in the captured digital image and on the above-mentioned mathematical model (block 300).

As regards the computation of the atmospheric precipitation brightness in the captured digital image, it may be computed as the sum of the brightness of the pixels in the captured digital image and corresponding to the atmospheric precipitation, in the case of rain the pixels corresponding to the raindrops.

To do this, it is therefore preliminarily necessary to discriminate the atmospheric precipitation, i.e., the atmospheric precipitation elements, e.g., the raindrops, in the captured digital image, from the remainder of the environment shown in the captured digital image, so as to determine which pixels in the captured digital image correspond to the atmospheric precipitation and which do not, taking into account that in the captured digital image the atmospheric precipitation occurs in the form of traces or stripes elongated in a generally vertical direction, more or less inclined from the vertical, depending on the direction of the atmospheric precipitation.

To do this, the atmospheric precipitation rate computation software is designed to first compute an image equivalent to the captured one but free of atmospheric precipitation traces (block 110). This can be accomplished by comparing the captured digital image with other images captured in time instants immediately preceding or following that in which the image from which the atmospheric precipitation traces must be removed is captured. As the likelihood that atmospheric precipitation traces are in the same position in two different time instants is very low, the same atmospheric precipitation traces are present only in one image and can be easily detected and removed. An alternative method is applying image filters specially designed to remove atmospheric precipitation traces from a captured digital image, thus obtaining an image free of atmospheric precipitation traces: for this purpose, moving average filters and median filters are known, but other types of image filters may also be used.

The atmospheric precipitation rate computation software is then designed to compute an image containing atmospheric precipitation traces only by subtracting from the captured digital image the one free of atmospheric precipitation traces (block 120), and then compute the atmospheric precipitation brightness in the captured digital image based on the image containing the atmospheric precipitation traces only, and in particular by adding the brightness contributions of the of atmospheric precipitation traces, making, if and where necessary, the corrections described in detail below (block 130).

As regards the mathematical modelling of the dependence of the atmospheric precipitation brightness in the captured digital image on the atmospheric precipitation rate in the environment shown in the captured digital image, the Applicant has developed a mathematical model in which the atmospheric precipitation brightness in the captured digital image is a function of:

the atmospheric precipitation rate in the environment shown in the captured digital image, which is the unknown quantity in the mathematical model and the value of which is to be computed, the average brightness of the captured digital image, which may be computed as the ratio of the sum of the brightness of all the pixels in the captured digital image to the number of pixels in the image, and image capturing parameters, which comprise:
shooting parameters of the digital image/video capture apparatus 10, which, as is known, include, merely by way of non-limiting example, one or more of the shooting or exposure time, the diaphragm aperture degree, the light sensitivity of the digital image sensor (ISO, gain), white balance, etc., and calibration parameters indicative of the characteristics of the digital image/video capture apparatus 10 with which the captured digital image is captured, which may include, merely by way of non-limiting example, one or more of a brightness response of the digital image/video capture apparatus 10 to ambient brightness, which may be calibrated by taking a series of shots with known shooting parameters and measuring the ambient brightness, and a reflexivity of the environment shown in the captured digital image, which may be calibrated by having available at least one digital image of the environment and at the same time a measurement of the ambient brightness.

The brightness response of the digital image/video capture apparatus 10 to the ambient brightness is a quantity indicative of the dependence of the atmospheric precipitation brightness in the captured digital image on the ambient brightness shown in the captured digital image, and on the image capture parameters, i.e., the characteristics of the digital image/video capture apparatus 10 and the shooting parameters.

In particular, referring for descriptive convenience to an atmospheric precipitation in the form of rain, the atmospheric precipitation brightness in the captured digital image may conveniently be computed as follows:

i) estimating the brightness of a raindrop with a given diameter: the brightness is a function of the size of the raindrop trace in the captured digital image, which in turn may be computed based on the raindrop diameter and on the captured digital image shooting parameters, on the ambient brightness shown in the captured digital image, on the brightness response of the digital image/video capture apparatus 10 to the ambient brightness, and on the brightness of the ambient background shown in the captured digital image and free of raindrop traces, according to the following formula (1):

$$\Delta I_D = L_P \left( \frac{\tau}{t_e}(I_D - I_B)D_P - \frac{c_P \cdot S^2}{\frac{\tau}{t_e}(I_D - I_B)} \right) \quad (1)$$

where $\Delta I_D$ is the brightness of a raindrop with diameter $D_P$ expressed in pixels and whose trace in the digital image is $L_P$ pixels long, T is the time of permanency of the rain drop with brightness $I_D$ in the background free of raindrops traces and that has brightness $I_B$, $C_P$ is the size of the raindrop confusion circle expressed in pixels, S is the cut-off intensity threshold, and $t_e$ is the exposure time of the captured digital image. $I_D$ may also be expressed by the following formula (2):

$$I_D = k \cdot I_M \left( \frac{t_e \cdot ISO}{FN^2} \right) \quad (2)$$

where k is the brightness response of the digital image/video capture apparatus 10 to the ambient brightness, $I_M$ is the ambient brightness shown in the captured digital image, $t_e$ is the exposure time of the captured digital image, ISO is the speed of the film with which the digital image is captured, and FN is the focal ratio with which the digital image is captured;

ii) probability weighing the brightness of a raindrop with a given diameter in a given location in the environment shown in the captured digital image as a function of its location in the environment shown in the captured digital image and of the atmospheric precipitation rate in the captured digital image, according to the following formula (3):

$$Lum_w = \Delta I_D \cdot p(z) \cdot p(D) = \Delta I_D \cdot \frac{3z^2}{z_+^3 - z_-^3} \cdot N_0 \cdot e^{-D/\overline{D}} \quad (3)$$

where $z_+$ is the maximum distance at which a raindrop can be detected in the framed volume, $z_-$ is the minimum distance, with $N_0$ a diameter distribution scale coefficient equal to $8 \cdot 10^{-6}$, and $\overline{D} = 0.2255 \cdot int^{2/5}$ is an average diameter function of the atmospheric precipitation rate int, which is thus related to the atmospheric precipitation brightness; and iii) integrating the raindrop brightness in the integration domains defined by the geometric space of the environment shown in the captured digital image and by the raindrop observable diameters, thus allowing the atmospheric precipitation brightness in the captured digital image to be computed according to the following formula (4):

$$Lum_{tot} = \int_{D_-}^{6} V(D,S) \cdot p(D) \int_{z_-}^{z_+} \Delta I_D \cdot p(z) dz \, dD \quad (4)$$

where, in addition to the above-described quantities, the term appears:

$$V(D, S) = \frac{h^3 W_P (z_+^3 - z_-^3)}{f^2 H_P}$$

which expresses the explorable volume in the captured digital image, and where $W_P$ and $H_P$ are the digital image height and width, respectively, expressed in pixels, h is the height of the sensor of the capture apparatus, and f is the focal distance of the capture apparatus.

Conveniently, the integration domain limits are a function of both the minimum brightness observable at each point in the environment shown in the captured digital image and for each raindrop observable diameter, and the minimum diameters of raindrops observable at each point in the environment shown in the captured digital image, and are computed according to the formulas (5) and (6):

$$D_- = \left(\frac{S \cdot t_e}{(I_D - I_B)1.69 \cdot 10^{-4}}\right)^2 \quad (5)$$

$$z_\pm = z_0 \pm \frac{(I_D - I_B)1.69 \cdot 10^{-4} \cdot D^{3/2} \cdot z_0}{A \cdot S \cdot t_e} \quad (6)$$

where, in addition to the above-indicated quantities, $z_0$ is the focus distance, and A is the opening of the digital image capture apparatus.

Formula (4) defines the mathematical model that expresses the dependence of the atmospheric precipitation brightness $Lum_{tot}$ in the captured digital image on the above-indicated quantities, including the atmospheric precipitation rate int in the environment shown in the captured digital image, which atmospheric precipitation rate is, as mentioned, the unknown quantity which is to be computed. By knowing the mathematical model and knowing the atmospheric precipitation brightness in the captured digital image (computed in block 200), it is therefore possible to compute the unknown quantity represented by the atmospheric precipitation rate in the environment shown in the captured digital image capable of generating the computed atmospheric precipitation brightness in the captured digital image (block 300), numerically reversing the above-indicated formula.

The atmospheric precipitation rate computation software may be enriched to such an extent as to take into account one or more of the below-described factors.

One of these factors is related to the fact that a raindrop brightness in a captured digital image is also influenced by the reflectivity characteristics of the environment shown in the captured digital image, whereby the accuracy of the computation of the atmospheric precipitation brightness in the captured digital image may be improved by dividing the captured digital image into hue classes, which comprises identifying in the captured digital image different areas each of which with a homogeneous hue, i.e., in each of which the pixel brightness in the area belongs to an associated brightness range, then computing an atmospheric precipitation brightness for each hue class, and finally appropriately weighted adding the atmospheric precipitation brightness of the various hue classes.

Another of these factors is related to the fact that, as previously mentioned, a raindrop brightness in a captured digital image is a function of the ambient brightness shown in the captured digital image, which is in turn related to the average brightness of the captured digital image. Therefore, by measuring the ambient brightness during image capturing in different ambient brightness conditions, and using known and constant capture parameters, it is also possible to define a law that relates the average brightness of a captured digital image to the ambient brightness in which that image is captured, whereby the atmospheric precipitation rate computation software also allows the ambient brightness shown in a captured digital image to be simply computed based on the average brightness of a captured digital image and on the reflectivity of the environment shown in the captured digital image.

In addition, this method may be simplified by knowing a priori the brightness response of the digital image/video capture apparatus 10 to the ambient brightness, thus avoiding capturing images in different ambient brightness conditions.

Alternatively, the measurement of the ambient brightness in the captured digital image may be avoided, and the brightness response of the digital image/video capture apparatus 10 to ambient brightness may be obtained indirectly by capturing different images of the environment with different shooting parameters, and analysing how the variation of the shooting parameters affects the average brightness of the captured digital images.

Alternatively, the ambient brightness in the captured digital image may be derived indirectly from the shooting parameters of the captured digital image, provided that it is captured using the shooting parameters automatically selected by the digital image capture apparatus 10 to optimize image exposure, and provided that a relationship has previously been defined between the shooting parameters chosen by the digital image capture apparatus 10 and the ambient brightness.

In addition, computation of the image with atmospheric precipitation traces only may be improved by excluding from the captured digital image areas that could cause disturbances in the detection of atmospheric precipitation traces. This could for example be accomplished by applying to the captured digital image a filter (mask) that could be defined in periods free of atmospheric precipitation, such as to exclude from the computation of the atmospheric precipitation brightness those areas in the captured digital image which are too bright, in which atmospheric precipitation traces are scarcely detectable, or areas with rapidly moving objects which may be confused with atmospheric precipitation traces. In this case, the brightness contribution will not be from the entire captured digital image but only from a portion thereof, so the atmospheric precipitation brightness computed based on the image containing atmospheric precipitation traces only will be recomputed in proportion to the unmasked captured digital image percentage.

In addition, computation of the atmospheric precipitation brightness in a captured digital image may be improved so as to reduce the contribution of digital noise, which can be modelled as a stochastic process that acts on each pixel of the captured digital image, and the characteristics of which may be preventively calibrated based on the characteristics of the digital image/video capture apparatus 10 and on the shooting parameters.

This calibration can be carried out by capturing a series of images free of atmospheric precipitation with known image capture parameters, in which the only contribution to the atmospheric precipitation brightness variation in the captured images is due precisely to digital noise. This brightness contribution may then be analysed and modelled with an appropriate distribution the parameters thereof can be estimated based on the image capture parameters and the ambient brightness.

During computation of the atmospheric precipitation, the brightness contribution resulting from digital noise may be assessed, the characteristics of which are known from the captured digital image, and removed from the atmospheric precipitation brightness in the captured digital image, whereby the atmospheric precipitation rate in the captured digital image is computed based on an atmospheric precipitation brightness so corrected as to remove the digital noise contribution.

The digital noise contribution may be further reduced by applying to the captured digital image a filter such as to exclude from the computation of the atmospheric precipitation brightness, those pixels in the captured digital image corresponding to the atmospheric precipitation and having a brightness below a brightness threshold. At the computation level, the brightness threshold changes the integration domain boundaries, as fewer atmospheric precipitation traces become observable.

Lastly, the atmospheric precipitation brightness in the captured digital image may be corrected to eliminate any effects due to an imperfect focusing of the digital image/video capture apparatus 10.

The invention claimed is:

1. An atmospheric precipitation rate computation system (1) comprising:
   an electronic digital image/video capture apparatus (10) to capture digital images/videos of an environment where an atmospheric precipitation is taking place; and
   an electronic digital image processing apparatus (20) in communication with the electronic digital image/video capture apparatus (10) to receive therefrom and process the captured digital images/videos to compute atmospheric precipitation rates of atmospheric precipitations which are taking place in the environments depicted in the received digital images/videos;
   wherein the electronic digital image processing apparatus (20) is configured to compute an atmospheric precipitation rate of an atmospheric precipitation which is taking place in an environment depicted in one captured digital image of the digital images captured by the electronic digital image/video capture apparatus (10) by:
   identifying atmospheric precipitation pixels in the captured digital image which represent precipitation elements;
   computing an atmospheric precipitation brightness in the captured digital image based on changes in brightness produced by the atmospheric precipitation at the identified atmospheric precipitation pixels with respect to a corresponding background brightness; and
   computing the atmospheric precipitation rate with the captured digital image based on the computed atmospheric precipitation brightness and on a stored mathematical model that expresses atmospheric precipitation brightness in one digital image as a function of an atmospheric precipitation rate of an atmospheric precipitation that is taking place in an environment depicted in the one digital image.

2. The atmospheric precipitation rate computation system (1) of claim 1, wherein the electronic digital image processing apparatus (20) is further configured to compute the atmospheric precipitation brightness in the captured digital image by:
   identifying and removing (110) atmospheric precipitation traces from the captured digital image, thus computing a digital image free of any atmospheric precipitation traces,
   subtracting (120) the digital image free of any atmospheric precipitation traces from the captured digital image, thus computing a digital image with atmospheric precipitation traces only, and
   summing (130) the brightness of the atmospheric precipitation pixels corresponding to the atmospheric precipitation traces in the digital image with atmospheric precipitation traces only.

3. The atmospheric precipitation rate computation system (1) of claim 2, wherein the electronic digital image processing apparatus (20) is further configured to compute a digital image free of any atmospheric precipitation traces by filtering out from the captured digital image those areas that could cause disturbances in the identification of atmospheric precipitation traces, such as high-brightness areas where the atmospheric precipitation traces are poorly identifiable, or areas where quickly moving objects are depicted, which can be confused with atmospheric precipitation traces.

4. The atmospheric precipitation rate computation system (1) of claim 1, wherein the electronic digital image processing apparatus (20) is further configured to compute the atmospheric precipitation brightness in the captured digital image by:
   splitting the captured digital image into tone classes, wherein splitting the captured digital image into tone classes comprises identifying in the captured digital image areas, each of which with homogeneous tones,
   identifying atmospheric precipitation pixels which represent precipitation elements in each one of the different tone classes;
   computing the atmospheric precipitation brightness in each one of the different tone classes based on changes in brightness produced by the atmospheric precipitation at the identified atmospheric precipitation pixels with respect to the corresponding background brightness, and
   weightily summing the atmospheric precipitation brightness computed for each one of the different tone classes.

5. The atmospheric precipitation rate computation system (1) of claim 1, wherein the mathematical model expresses the atmospheric precipitation brightness in the captured digital image as a function of:
atmospheric precipitation rate in the environment depicted in the captured digital image,
average brightness of the captured digital image, and
image capture parameters comprising:
shooting parameters of the electronic digital image/video capture apparatus (10), and
calibration parameters indicative of features of the electronic digital image/video capture apparatus (10) with which the digital image has been captured, and comprising at least a light response of the electronic digital image/video capture apparatus (10) to ambient light.

6. The atmospheric precipitation rate computation system (1) of claim 5, wherein light response of the electronic digital image/video capture apparatus (10) to ambient light expresses dependency of the atmospheric precipitation brightness in the captured digital image on the brightness of the environment depicted in the captured digital image and on the image capture parameters;
wherein the atmospheric precipitation brightness in the captured digital image is computed by:
estimating the brightness of an atmospheric precipitation element with a given size, which brightness is a function of the size of the trace of the atmospheric precipitation element in the captured digital image, which trace size is in turn computable based on the size of the atmospheric precipitation element and on the shooting parameters of the captured digital image, on the brightness of the environment depicted in the captured digital image, on the brightness response of the electronic digital image/video capture apparatus (10) to the ambient brightness, and on the background brightness of the environment depicted in the digital image free of any atmospheric precipitation traces;
probability weighing the brightness of the atmospheric precipitation element with a given size in a given location in the environment depicted in the captured digital image as a function of the location of the atmospheric precipitation element in the environment depicted in the captured digital image and of the atmospheric precipitation rate in the captured digital image, and
integrating the brightness of the atmospheric precipitation element in integration domains defined by the geometric space of the environment depicted in the captured digital image and the observable sizes of the atmospheric precipitation elements units, thus computing the atmospheric precipitation brightness in the captured digital image.

7. The atmospheric precipitation rate computation system (1) of claim 5, wherein the mathematical model further expresses the brightness of the environment depicted in the captured digital image as a function of an average brightness of the captured digital image.

8. The atmospheric precipitation rate computation system (1) of claim 5, wherein the mathematical model further expresses the brightness of an environment depicted in the captured digital image as a function of shooting parameters automatically chosen by the electronic digital image/video capture apparatus (10).

9. The atmospheric precipitation rate computation system (1) of claim 1, wherein the electronic digital image processing apparatus (20) is further configured to improve computation of the atmospheric precipitation brightness in the captured digital image by mitigating a digital noise contribution and possible effects due to the electronic digital image/video capture apparatus (10) being slightly out of focus.

10. The atmospheric precipitation rate computation system (1) of claim 9, wherein the electronic digital image processing apparatus (20) is further configured to further mitigate the digital noise contribution by applying to the captured digital image a filter designed to filter out from the computation of the atmospheric precipitation brightness the atmospheric precipitation pixels in the captured digital image representing the atmospheric precipitation and having a brightness lower than a threshold brightness.

11. The atmospheric precipitation rate computation system (1) according to claim 1, further comprising an electronic display device (30) in communication with the electronic digital image processing apparatus (20) to receive therefrom and display the computed atmospheric precipitation rates.

12. A computer program product for atmospheric precipitation rate computation, the computer program product being embodied in non-transitory computer readable storage media and loadable in an electronic digital image processing apparatus (20) in an atmospheric precipitation rate computation system (1), the computer program product comprising instructions to:
capture, in an electronic digital image/video capture apparatus (10), digital images/videos of an environment where an atmospheric precipitation is taking place;
receive and process, by the electronic digital image processing apparatus (20) in communication with the electronic digital image/video capture apparatus (10), captured digital images/videos from the electronic digital image/video capture apparatus (10) to compute atmospheric precipitation rates of atmospheric precipitations which are taking place in the environments depicted in the received digital images/videos; and
compute, by the electronic digital image processing apparatus (20), an atmospheric precipitation rate of an atmospheric precipitation which is taking place in an environment depicted in one captured digital image by:
identifying atmospheric precipitation pixels in the captured digital image which represent precipitation elements;
computing an atmospheric precipitation brightness in the captured digital image based on changes in brightness produced by the atmospheric precipitation at the identified atmospheric precipitation pixels with respect to a corresponding background brightness; and
computing the atmospheric precipitation rate with the captured digital image based on the computed atmospheric precipitation brightness in the captured digital image and on a stored mathematical model that expresses atmospheric precipitation brightness in one digital image as a function of an atmospheric precipitation rate of an atmospheric precipitation that is taking place in an environment depicted in the one digital image.

* * * * *